United States Patent
Burgoon

[15] 3,680,071
[45] July 25, 1972

[54] VOLTAGE INDICATOR FOR HIGH VOLTAGE SWITCHGEAR

[72] Inventor: Richard J. Burgoon, Pittsburgh, Pa.

[73] Assignee: Westinghouse Electric Corporation, Pittsburgh, Pa.

[22] Filed: Dec. 24, 1970

[21] Appl. No.: 101,347

[52] U.S. Cl. .................340/248 R, 324/96, 324/122, 324/133
[51] Int. Cl. ...................................................G08b 21/00
[58] Field of Search ..................340/248, 253, 255; 324/96, 324/122, 133; 174/139, 142

[56] References Cited

UNITED STATES PATENTS

| | | |
|---|---|---|
| 3,513,394 | 5/1970 | Tachick.................................324/133 |
| 3,524,178 | 8/1970 | Stratton................................340/248 |
| 3,544,985 | 12/1970 | Lawrence.............................340/248 |

*Primary Examiner*—John W. Caldwell
*Assistant Examiner*—Daniel Myer
*Attorney*—A. T. Stratton and C. L. McHale

[57] ABSTRACT

A neon glow tube is mounted proximate to the high voltage conductors of metalclad or metal enclosed switch-gear. In the presence of high voltage on these conductors the tube glows. A light sensing device such as a cesium cell detects the glow or light from the neon tube and converts it to electrical energy which may be amplified through a suitable amplifying means and transmitted to a remote indicator. Capacitive coupling between the metal housing of the switchgear and a flat plate attached to the flow tube is used to complete the effective circuit for the glow tube. The glow tube and cesium cell may be mounted within a porcelain enclosed cylinder to avoid the effect of ambient light.

14 Claims, 6 Drawing Figures

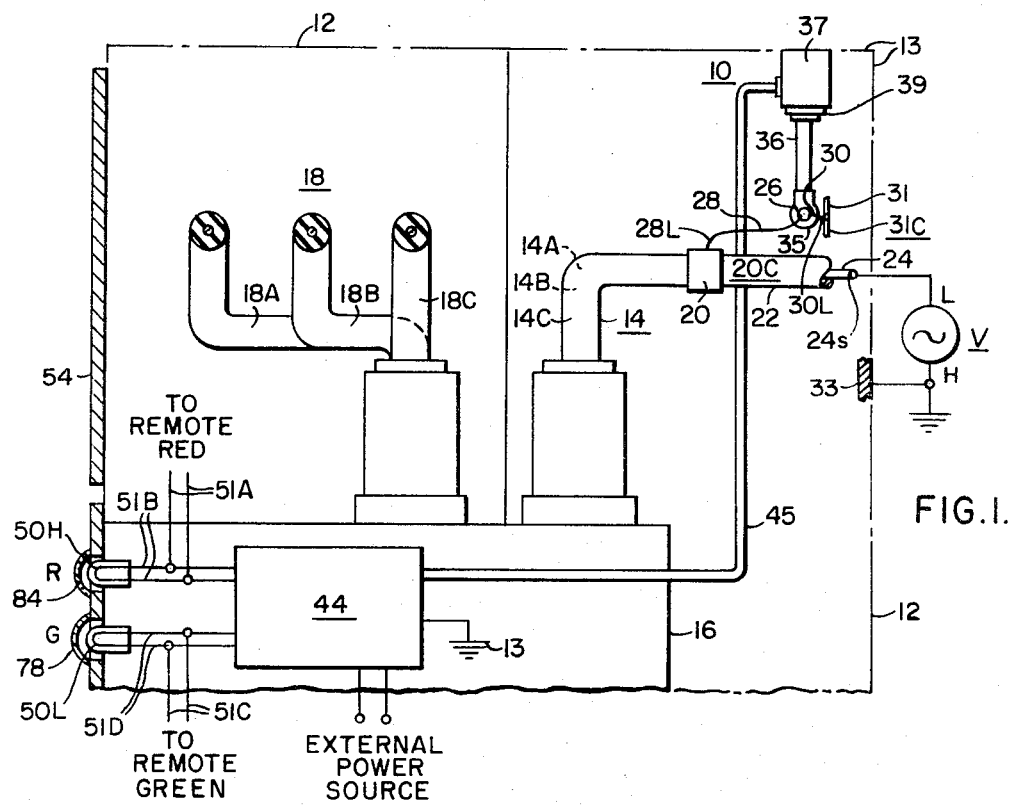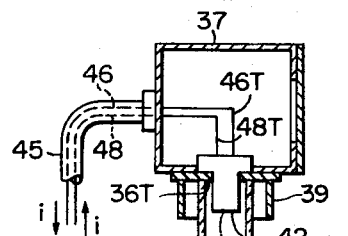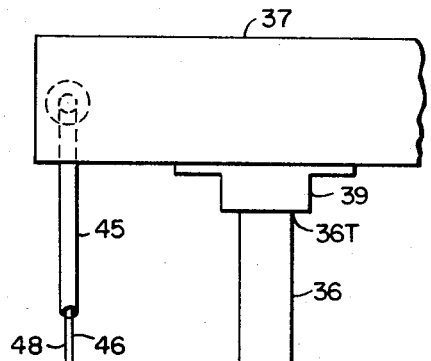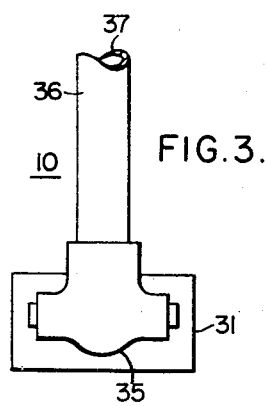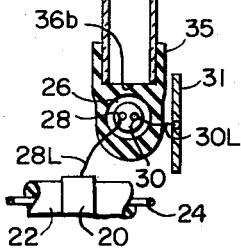

3,680,071

VOLTAGE INDICATOR FOR HIGH VOLTAGE SWITCHGEAR

CROSS REFERENCE TO RELATED APPLICATIONS

Certain inventions disclosed in this application are disclosed and claimed in copending application, Ser. No. 101,346 filed concurrently by John M. Kozlovic and Russell E. Frink, which is assigned to the same assignee as the present application.

BACKGROUND OF THE INVENTION

This invention relates to potential indicators for high voltage switchgear.

High voltage switchgear requires an indicating system whereby the presence of voltage on the conductors within the metalclad switchgear is indicated to operating personnel in the vicinity of the switchgear who may have occasion to enter the equipment to perform some function therein. Ground test devices are sometimes used to indicate the presence of high voltage but they are relatively large and cumbersome. In addition, the use of neon glow lights has been attempted but such neon lights or tubes have been mounted outside of the switchgear equipment. In such an arrangement, the neon tube may sometimes glow because of the existence of extraneous electric fields other than the field emanating from the conductors whose potential the neon tube is intended to monitor causing confusion and uncertainty. In the interest of safety and a reliable indication of the presence of potential, it would be desirable if the neon tube could be mounted relatively close to the high voltage conductors whose potential the neon tube is intended to monitor. Certain problems arise if the glow tubes are mounted inside of the associated switchgear where they are not readily visible to personnel outside such equipment. It would therefore be desirable if the light which a glow tube produces could be transformed or converted into a signal which in turn could be employed to remotely indicate production of light by the glow tube and the presence of high voltage. U.S. Pat. No. 3,335,367, which is assigned to the same assignee as the present application, and U.S. Pat No. 3,485,940 show different applications of light sources used in conjunction with high voltage conductors which provide an indication of the magnitude of the voltage or potential at the conductor. However, neither of these arrangements is adapted for use with metalclad or metal enclosed switchgear. In such arrangements, the light source is typically employed incidentally as part of an overall system and is not the primary source of voltage indication typically employed. In addition, the light source is used in conjunction with relatively complicated coding or signalling devices in a system which is used to indicate as nearly as possible the magnitude of voltage present at the conductor rather than the presence or absence of a predetermined potential. U.S. Pat. No. 3,524,178 shows a voltage indicator lamp which is only meant to be energized by inspecting personnel and which is capacitively coupled between the inner and outer electrodes or a coaxial conductor.

SUMMARY OF THE INVENTION

In accordance with the invention, the presence of high voltage within the associated switchgear is indicated in a highly reliable manner whereby a neon glow tube is connected at one of its terminals to an associated capacitance ring which, in turn, is disposed to surround a high voltage insulated electrical conductor. The other terminal is connnected to a substantially flat metal plate which is aligned substantially parallel to one of the grounded sides or walls of the metal housing of the associated switchgear. The electrical connection to the flat metal plate creates a more effective capacitive coupling between the terminal and the metal housing of the associated switchgear. As a result, an effective circuit is created which extends from the high voltage conductor through the glow tube, or neon tube to the grounded metal housing of the switchgear. In one case, the dielectric portion of the effective capacitance is formed by the insulation of the high voltage conductor and, in the other case, the dielectric portion of the effective capacitance is the air disposed between the flat plate on the glow tube and the metal housing of the switchgear. As high voltage is applied to the insulated conductor, and electric field emanates from the conductor which, in turn, causes the tube to glow or produce light at a location within the switchgear rather than outside the switchgear. The glow or light may be detected by a cesium photoelectric cell disposed within the switchgear and mounted proximate or adjacent to the glow tube. The cell may be of such a design that it changes its electrical resistance when exposed to light. The cell is connected to an amplifying device which amplifies the effect of the change in resistance and actuates the energization of an indicating light which is disposed either on the front panel of the switchgear or at some remote location, such as the console of a monitoring station. The space between the cesium cell or light sensing cell and the neon glow tube may be enclosed by a dielectric or electrically insulating cylinder with both the glow tube and the light sensitive cell disposed within the cylinder. This has the effect of substantially removing extrinsic light from the area of the glow tube, thus providing a true indication of high voltage even when light filters through the various openings which may be provided in the metalclad or metal enclosed switchgear or one of the doors of the switchgear which may permit ambient light to enter. The cylinder which encloses the space between the neon tube and the light sensing cell may be made of porcelain which is susceptible to permeation by the strong electric field, which is also an effective insulator against high voltage, and which may also provide a strong structurally supporting means for the overall structure of the invention.

The disclosed potential detecting system has a built-in protective redundancy since it may include a plurality of detecting circuits when used with switchgear having a three-phase bus bar or conductor system. Therefore, if one detecting circuit should fail, the associated circuits would still indicate the presence of high voltage. In addition, a special fail-safe protective circuit may be provided which indicates the presence of high voltage (even if, in fact, no high voltage is present) should a failure occur in the detecting circuits.

BRIEF DESCRIPTION OF THE DRAWINGS

FIG. 1 shows a first embodiment of the invention mounted in metalclad switchgear;

FIG. 2 shows a cross-sectional view of the embodiment of the invention shown in FIG. 1;

FIG. 3 shows another view of the embodiment of the invention shown in FIG. 1;

FIG. 4 shows a different view of the embodiment of the invention shown in FIG. 1;

DESCRIPTION OF THE PREFERRED EMBODIMENT

Figure 5:
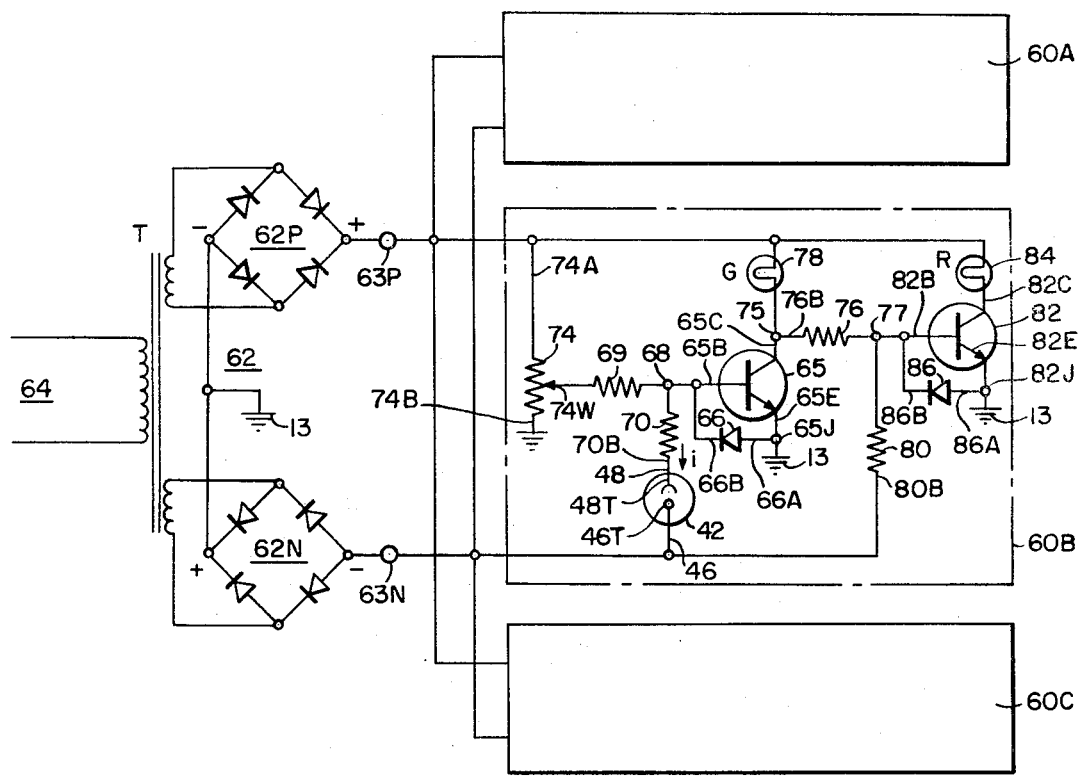
FIG. 5 shows a schematic diagram of a circuit embodying the invention.

Referring now to the drawings and FIG. 1 in particular, a voltage detector or voltage presence indicator 10 is shown which illustrates a first embodiment of the invention. Voltage detector 10 is shown mounted within metalclad or metal enclosed switchgear cabinet or housing 12, as shown diagrammatically in FIG. 1. The switchgear housing includes a plurality of planes or region of common electrical potential, as indicated at 13. Any point which lies in the planes 13 is at substantially a common point of electrical potential which is generally equal to ground or zero potential. Electrical conductors or insulated bus bars 14 for metal enclosed or metalclad switchgear 12 may be the conductors to be monitored for the detection of the presence of high voltage. Generally, there are three of these conductors or bus bars 14A, 14B and 14C disposed within each switchgear housing section 12. Where desired, any or all of the conductors 14 may be independently monitored by similar voltage detectors 10. Conductor or bus bar 18 may supply energy to circuit interrupter or circuit breaker unit 16 of the metalclad switchgear 12. Conductors 14A, 14B and 14C represent insulated incoming or outgoing leads for metalclad switchgear which supply power to or from the circuit breaker 16.

Mounted on each conductor 14 is a capacitive coupling band or metallic electrically conducting band 20 which acts as, or forms part of one (20C) of two capacitive means 20C and 31C. Another part of the capacitive means 20C is the surface 24S of conductor 24 which is adjacent to the metallic band 20. Band 20 is snugly or tightly secured to insulation 22 on conductor 14 by any suitable means. Insulation 22 is high voltage insulation which insulates the current carrying conductor 24 from the ground voltage potential planes 13 of the metalclad switchgear cabinet or enclosure 12 and which functions as the dielectric portion of the capacitive means 20C. Illuminating means or light producing means 26, having two terminals 28 and 30, is electrically and structurally attached or secured to capacitor band 20 by affixing or securing one of its terminals 28 to capacitor band 20. The other terminal 30 of gas discharge tube or neon lamp 26 is attached or connected to the first part of a second capacitive means 31C, specifically a first electrically conducting plate 31. Plate 31 may be a generally flat, electrically conducting plate mounted proximate or adjacent to an electrically conducting flat side or surface 33 of metal switchgear housing 12, said flat surface 33 being normally at substantially the same potential as ground and acting as the second plate or part of the second capacitive means 31C. Consequently, as can be seen by referring to FIG. 1, an electrical circuit extends from one end of the voltage source V connected to the conductor 24 through the electrical conductor 24; the capacitive means 20C comprising capacitor band 20, the surface 24S of electrical conductor 24 and dielectric or insulation 22; the lead 28L connected to terminal 28; terminal 28 of the gas discharge tube or neon lamp 26; terminal 30; the lead 30L connected to terminal 30; the capacitive means 31C comprising flat plate or electrically conducting member 31; the air dielectric between said plate 31 and surface 33, said surface 33 being normally connected to the other terminal of voltage source V which is connected to ground in this particular embodiment.

Consequently, when the proper voltage and frequency for voltage source V are applied to conductor 24, the previously described detecting circuit 10 causes glow tube or neon lamp 26 to produce light. This happens when strong electric fields are created within capacitive means 20C and 31C. Light producing means or neon lamp 26 as illustrated is enclosed within an electrically insulating boot or similar mounting means 35 which may be formed from rubber. Mounting means or flexible boot 35 is so constructed as to fit snugly on to the bottom 36b of the light excluding dielectric hollow chamber 36 and acts as both a support for lamp 26 and as a light shield for the otherwise open bottom 36b of the porcelain, cylindrical hollow chamber 36.

Referring now to FIG. 2, a hollow container or box 37 is shown mounted on the other end 36T or top part of light extruding cylinder 36 by means of a mounting assembly 39. Photosensitive cell or photocell 42 having terminals 48T and 46T is mounted within protective cell or bus duct conduit 37 so that only light from energized neon tube 26 impinges upon one surface 42A of photocell 42. Photocell 42 then responds to light from the tube 26 either by producing electron current or changing its resistance to control a combination amplifier-indicator means 44, as indicated in FIG. 1. Leads 48 and 46 which interconnect photocell 42 and amplifier-indicator means 44 are carried through conduit or protective sheathing 45 as shown in FIGS. 1 and 2. FIGS. 3 and 4 show other views of part of the indicator assembly 10 which is shown in FIG. 2.

Referring again to FIG. 1 in which amplifier-indicator or lamp driver 44 is indicated, it will be noted that lamp driver 44 may have four sets of output leads 51A, 51B, 51C and 51D. It also has terminals for connection to an external source of power. Terminals 51B and 51D are the main output terminals of lamp driver 44 and leads 51A and 51C are parallel leads to a remote indicator (not shown). Amplifier-indicator or lamp driver 44 is adapted to energize at least two lamps 84 and 78. Lamp 84 may be a red indicating lamp, while lamp 78 may be a green indicating lamp. As was previously mentioned, leads 51A and 51C may be used to control the energization of similar remote indicating lamps (not shown) also. Consequently, should light producing means or neon lamp 26 be energized, photosensitive cell or cesium cell 42 will vary in resistance or produce electrical energy depending on the internal construction of cell 42 in such a manner as to cause anode 46T and cathode 48T to be energized, thus causing current $i$ to flow in leads 46 and 48 and, consequently, causing lamp driver 44 to respond. In the present case, the presence of high voltage is indicated by the illumination of lamp 84 and the extinguishing or deenergization of lamp 78. Should no high voltage be present, the opposite would occur in that lamp 78 would be energized and 84 would be deenergized or extinguished. Should there be a failure in photosensitive means or cesium cell 42, lamp driver 44 would automatically energize or illuminate lamp 84 indicating the presence of high voltage even if high voltage was not present to thus provide a fail-safe operation as will be described hereinafter.

Referring now to FIG. 5, a schematic diagram of the circuit 60, which forms part of voltage presence detector or potential indicator 10, is shown. As illustrated, there are three amplifier-indicator circuits 60A, 60B, 60C, corresponding to three voltage detectors 10A, 10B, 10C each of said detectors being mounted near or adjacent one of the insulated conductors 14A, 14B and 14C so that high voltage on any or all of the leads 14 can be detected and indicated. Power supply 62 may supply power for all three indicator circuits. Power supply 62 is a unidirectional or direct current power supply which is connected to alternating current source 64 through a transformer T. As illustrated, power supply 62 comprises a positive power supply 62P and a negative power supply 62N. Positive power supply 62P comprises a full wave rectifier circuit whose input terminals are connected to one secondary winding of the transformer and whose positive output terminal is connected to a common terminal 63P for all three circuits. Negative power supply 62N comprises a full wave rectifier circuit whose input terminals are connected to a separate secondary winding of the transformer T and whose negative output terminal 63N is a common negative terminal for all three circuits. Amplifier circuit 60B is the only one shown in detail, although it is to be understood that circuits 60A and 60C may comprise the same circuitry. Circuit 60B comprises a first control means comprising an electronic valve or solid state NPN transistor 65 with a first load terminal or collector 65C, a second load terminal or emitter 65E, and a control terminal or base 65B. Mounted between emitter 65E and base 65B is a first unidirectional electronic valve or solid state diode having anode 66A and cathode 66B. Anode 66A is connected to emitter 65E at junction point 65J and both, in turn, are connected to ground or ground potential line 13. Cathode 66B and base 65B are also connected together at junction point 68. Also connected to junction point 68 is one end of the first resistor 69 of a first set of biasing resistive components or resistors and one end of the second resistive component or resistor 70. The other end of resistor 70 is connected to cesium cell 42 by means of lead 48 where lead 48 is connected to terminal or cathode 48T of said cell 42, as previously described. Lead 46 is connected between anode 46T of the cell 42 and negative power supply terminal 63N. The other end of resistor 69 is connected to the wiper or movable potentiometer arm 74W of bias adjustment resistive component or potentiometer 74. Potentiometer 74 includes two other terminals 74A and 74B with terminal 74A being connected to the positive power supply terminal 63P and terminal 74B being connected to ground potential 13. The collector 65C of transistor 65 is connected to a junction point 75. Also connected to junction point 75 is green indicator lamp 78 and a resistor or resistive component 76 similar to resistive component 69. The other end or other terminal of indicating lamp 78 is connected to positive power supply terminal 63P and the other end of biasing resistive component 76 is connected to a second biasing resistor 80 and also to base 82B of second transistor 82.

Second transistor or controlled electronic valve 82 has a first load terminal or collector 82C and a second load terminal or emitter 82E, in addition to control terminal or base 82B. Collector 82C is connected to one end of red indicator lamp 84, the other end of said lamp being connected to the positive power supply terminal 63B. Also provided is another unidirectional valve or solid state diode 86 having anode 86A and cathode 86B. Similarly to the previously mentioned diode 66 and transistor 65, anode 86A is connected to emitter 82E and cathode 86B is connected to base 82B. Both diodes 66 and 86 are provided to protect the associated transistors 86 and 82, respectively, from large reverse voltage spikes across the respective base to emitter circuits. As shown, bias resistor 80 is connected at its lower end 80B to negative power supply terminal 63N and the junction 82J, formed by the connection of anode 86A and emitter 82E, is connected to ground as indicated at 13.

In the operation of the circuits 60A, 60B and 60C, when none of the incoming conductors 14 has any voltage V impressed upon it, the bias adjust resistors 69 and 70 are selected so that potentiometer movable terminal 74W may be adjusted to apply a voltage at terminal 68 and a base drive current into base 65B which will maintain transistor 65 in the "ON" state or condition. When transistor 65 is in the "ON" state, a low resistance path exists between junction point 75 and ground 13. This causes green light 78 to be energized and light up or illuminate due to the current flowing from positive terminal 63P to ground terminal 13. Since terminal 75 is nearly at ground potential, the current flowing into base 82B and the voltage at junction 77 is of a sufficient negative magnitude as to maintain transistor 82 in the "OFF" state or operating condition. When transistor 82 is in its "OFF" state, a high impedance circuit exists between collector 82C and ground 13, thus red light 84 will be substantially deenergized and will not light up because substantially no current passes through it. It should be noted that the resistance of resistor 70 and the resistance of cesium cell 42 between cathode 48T and anode 46T is of sufficient total magnitude as to prevent the shunting of current from base 65B through resistor 70 and cell 42, respectively, during the assumed operating condition.

When, however, high voltage is present on any of the conductors or bus bars 24, light producing means or neon light 26 activates photocell 42 in such a manner that the resistance between terminals 48T and 46T is significantly reduced. This provides a low resistance current path for current i from junction point 68. When this happens, a significant part of current i is shunted through the combination of resistor 70 and cesium cell 42 to negative power supply terminal 63N and away from base 65B. This also causes the voltage to drop at junction point 68. When this happens, the previously saturated transistor 65 turns "OFF," thus creating a high impedance circuit between terminal 75 and ground 13. When this occurs, the current which was previously flowing through green light 78 and through transistor 65 must now flow through the combination of biasing resistors 76 and 80 of transistor 82. Since the total resistance of resistors 76 and 80 is of a high magnitude, much less current flows through this branch and green light 78 will be substantially deenergized and not light up because the energy provided by the reduced current is insufficient to cause the filament to glow. However, terminal 75 is operatively changed from a virtual ground potential 13 and is at a much higher positive potential with respect to ground due to the current flow from positive power supply terminals 63P. When this occurs, terminal 77 between bias adjust resistors 76 and 80, changes to a more positive value of voltage and sufficient current flows into base 82B to turn transistor 82 "ON." When this occurs, there is a conducting path to ground 13 from terminal 63P through red light 84. Sufficient current flows through red light 84 to energize it and light 84 lights up indicating the presence of high voltage. Should neon tube or lamp 26 extinguish the resistance in photocell or cesium cell 42 will increase again, thus returning transistor 65 to the "ON" state and transistor 82 to the "OFF" state, thus energizing green light 78 and deenergizing or extinguishing red light 84.

Figure 6:
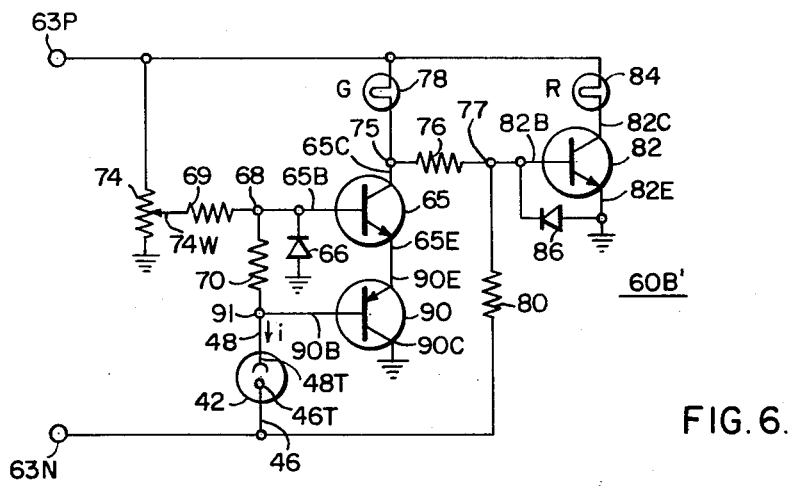
FIG. 6 shows another embodiment of the circuit shown in FIG. 5.

Referring now to FIG. 6, another embodiment of the circuit shown in FIG. 5 is illustrated. The circuit 60B' shown in FIG. 6 is the same as the circuit 60B of FIG. 5 except that an additional controlled electronic valve or transistor 90 is connected between the emitter 65E of transistor 65 and the ground 13. The transistor 90 is of a solid state type which is opposite to the transistor 65. When transistor 65 is an NPN transistor as shown, transistor 90 will be a PNP transistor (and vice versa). Transistor 90 has a first load terminal or collector 90C, a second load terminal or emitter 90E and a control terminal or base 90B. Second load terminal 90E is connected to emitter 65E of transistor 65, while collector terminal 90C is connected to ground 13. The base 90B is connected to a junction point 91 between the cathode 48T of cesium cell 42 and bias resistor 70.

The operation of the circuit 60B' is similar to that of the circuit 60B shown in FIG. 5, except that if during a particular operating condition, something happens to increase the resistance between terminals 91 and 63N for some reason other than a planned increase in resistance between terminals 48T and 46T of cell 42 due to proper operation of the cell 42, then the circuit 60B' will respond in such a way that the red light 84 will be energized and green light 78 will be deenergized, even if no high voltage is present at the associated bus bars. The safety advantage of this protective arrangement is that it is preferable to indicate the presence of high voltage at the associated bus bars even when it is not present, than to not indicate the presence of high voltage when, in fact, it is present. In normal operation of the circuit 60B', that is, provided leads 48 and 46 and photoelectric cell 42 are functioning normally and are not opened, base 90B is maintained at a sufficiently negative voltage to keep the transistor 90 "ON" regardless of the resistance changes which result in the operation of the cesium cell 42. As can be seen, the effect of transistor 90 being "ON" is that a low resistance path exists between emitter 90E and collector 90C which is connected to ground. As a result, circuit 60B' as shown in FIG. 6 will normally operate in the same manner as circuit 60B shown in FIG. 5. Green light G will be energized and illuminate when no voltage is present on conductors 14 and red light R will light if voltage is present on the associated conductor 14. In other words, the transistor 90 will have no effect during normal operation of the circuit 60B'. However, should terminal 91 be operatively disconnected from terminal 63N because lead 48 or 46 is broken or inadvertently opened or cesium cell has opened or is inoperative, then the base 90B of transistor 90 will be operatively disconnected from the source of negative voltage 63N and the voltage value at the base 90B will be increased due to the exclusive presence of positive voltage at terminal 63P. Positive voltage on the base 90B of transistor 90 will cause transistor 90 to open or become substantially nonconducting regardless of what happens to any other transistor in the circuit. When transistor 90 is open, the path from 65E to 13 is broken and even though transistor 65 becomes saturated because it appears to the base 65B of transistor 65, that cesium cell 42 has merely increased in resistance as is the normal case, green light 78 will automatically be deenergized and extinguished and red light 84 will be energized and light up in the same manner as described previously with respect to circuit 60B. Consequently, whether or not any high voltage is present on conductors 24, red light 84 will light up causing any personnel checking the equipment to be cautious.

It is to be understood that voltage source V may be of any predetermined value and generated at any frequency sufficient to actuate the circuits described. It should also be noted that the particular circuit arrangement of voltage V and the various capacitive means or links, as described in FIG. 1, may be applied to a three-phase delta or star type circuit arrangement, where desired. It should also be noted that in place of a neon or gas discharge tube 26, any light producing device including a light emitting diode may be used provided it may be activated by the presence of high voltage. In addition, any type of photocell 42 may be used in place of a cesium photocell, provided it accomplishes the same purpose as a cesium photocell in the present invention. It is also to be understood that any number of leads 14 may be monitored simultaneously or separately by combinations of the embodiments described in the present invention. Thus, if any conductor or bus bar 14 within metalclad switchgear cabinet 12 indicates high voltage, a red light will flash indicating to the operator that high voltage is present within the cell. It is also to be understood that the transistors and diodes in circuit 60A, 60B, 60C may be replaced by electronic tubes or any other electrical control devices which accomplish the same purpose as the transistors and diodes described. It should also be understood that the power supply voltages 63P and 63N may be reversed and the NPN transistors replaced with PNP transistors and the directions of the diodes reversed such that a circuit, which accomplishes the same results as those accomplished by circuit 60B may be provided. It is also to be understood that the overall apparatus described in FIG. 1 may use either circuit 60B or circuit 60B'. Circuit 60B' differs primarily from circuit 60B in that it includes a fail-safe improvement of circuit 60B. It is to be understood that lamps 84 and 78 as well as any remote lamps may be energized by a single lead system where every lamp requires one power lead and a system common to complete an electrical circuit.

It is also to be understood that the word bus bar as used in the specification may apply to any electrical input or output conductor inside the cabinet or housing and onto which high voltage or potential may be applied.

The apparatus embodying the teachings of this invention has several advantages many of which are described in copending application, Ser. No. 101,346 previously mentioned. In addition, the capacitive means or links, especially the capacitive means or link between the cabinet of the metalclad switchgear and the neon lamp, offer definite advantages over those described in the previously mentioned application because of the electrically conducting plate 31. Also, the light shielding and supporting boot 35, the arrangement of the porcelain light excluding cell 36 which is provided in accordance with the present invention and the mounting of photoelectric or cesium cell 42 in an associated bus duct or protective enclosure 37 along with the use of the conduit 45 and the circuits 60B and 60B' which are uniquely adapted for use in a potential or voltage detector, as disclosed, combine to provide an efficient, fail-safe reliable indication of the presence of high voltage in any of the conductors or bus bars 14 within the metalclad or metal enclosed switchgear cabinet or housing 12.

I claim as my invention:

1. A voltage indicator system for use with an electrical conductor having electrical insulation disposed thereon comprising a light producing means having a plurality of terminals and adapted to produce light in the presence of a predetermined electric field, first and second capacitive means, said electrical conductor being capable of producing an electric field when a high voltage potential is applied thereto, said electric field being coupled to one said terminal of said light producing means through said first capacitive means, a photosensitive cell with a plurality of terminals, an amplifier-indicator connected in circuit relation with said cell, said light from said light producing means energizing said photosensitive cell to produce an output when said field is present, said amplifier-indicator being responsive to the output of said photosensitive cell to produce an indication of the presence of said field, said second capacitive means comprising a first electrically conducting plate which is electrically connected to another said terminal of said light producing means, a metallic enclosure comprising at least one electrically conducting surface, said indicator system being disposed inside said enclosure, said first plate being mounted in proximity with said surface to provide a capacitive coupling between said surface and said first capacitor plate.

2. A voltage indicator system as claimed in claim 1 wherein said light producing means comprises a gas discharge tube having two terminals, said first terminal being connected to said first capacitive coupling means, said second terminal being connected to said first electrically conducting plate.

3. A voltage indicator system as claimed in claim 2 wherein said first capacitive means comprises a metallic electrically conducting band mounted on and at least partially encircling said insulation, said insulation acting as a capacitor dielectric, the outer surface of said conductor acting as a capacitor plate of said first capacitive means.

4. A voltage indicator system as claimed in claim 3 wherein said gas discharge tube comprises a neon lamp, said surface of said enclosure comprises a flat side, said first plate is generally flat and mounted generally parallel to said flat side of said surface, said photosensitive cell comprises a cesium cell with anode and cathode terminals, and said cesium cell and said neon lamp are disposed within a light excluding dielectric hollow chamber.

5. A voltage indicator system as claimed in claim 4 wherein said dielectric material in said chamber comprises porcelain, said chamber being generally cylindrically shaped.

6. A voltage indicator system as claimed in claim 5 wherein the resistance of said cesium cell varies with the amount of said light from said neon lamp, said amplifier-indicator being adapted to respond to said variation in resistance.

7. A voltage indicator system as claimed in claim 5 wherein said cesium cell produces electrical energy when exposed to said light, said amplifier-indicator being adapted to respond to said electrical energy.

8. A voltage-indicator system as claimed in claim 6 wherein said amplifier-indicator includes a plurality of indicator lamps, one of said lamps being connected to indicate the presence of voltage on said conductor, another of said lamps being connected to indicate the absence of said voltage.

9. A voltage-indicator system as claimed in claim 8 wherein said amplifier-indicator comprises an amplifier-indicator circuit, said circuit comprising first and second controlled, electronic valves each having a control terminal and first and second load terminals, corresponding first and second sets of biasing resistive components connected to said valves, a unidirectional electronic valve connected to each of said controlled valves, each of said unidirectional valves having an anode and cathode, a set of resistive biasing elements with two input terminals and a third terminal connected to said first controlled valve, one of said controlled valves being connected to be normally conducting and the other of said valves being connected to be normally non-conducting in the absence of said voltage and to be actuated to opposite conducting states by said cell in the presence of said cell.

10. A voltage indicator system as claimed in claim 9 wherein said indicating lamps comprising a first indicating lamp of a first predetermined color to indicate the presence of voltage on said conductor and a second indicating lamp of a second predetermined color to indicate the absence of voltage on said conductor.

11. A voltage indicator system as claimed in claim 10 wherein positive and negative sources of direct electrical current are provided, said first load terminal of said controlled electronic valve is connected to said second indicating lamp and said second load terminal thereof is connected to ground and to said anode of the associated unidirectional electronic valve, said control terminal of said first controlled electronic valve being connected to said cathode of the associated unidirectional electronic valve and to a junction point between two of said biasing resistive components associated with said first controlled electronic valve, the first of said last-mentioned resistive components being electrically connected to said third terminal of said set of resistive elements, the second of said last-mentioned resistive components being electrically connected to said cathode of said cesium cell, said first load terminal of said second controlled electronic valve being connected to said first indicating lamp and said second load terminal thereof being connected to ground and to said anode of the associated unidirectional electronic valve, said control terminal of said second controlled valve being connected to the cathode of the associated unidirectional valve and to a junction point between two of said biasing resistive components associated with said second controlled electronic valve, one of said last-mentioned resistive components being connected at its remaining free terminal to first said load terminal of said first controlled electronic valve and to said second indicating lamp, one of said input terminals of said resistive biasing elements being connected to ground and the other of said input terminals and the free terminals of both of said indicating lamps being connected to said positive source of direct electrical current, said remaining free terminal of said second biasing resistive component associated with said second unidirectional electronic valve and said anode of said cesium cell being connected to said negative source of direct electrical current, said third terminal of said set of resistive elements being connected in such a position with respect to said elements that said first controlled electronic valve is normally conducting electrical current from said first load terminal to said second load terminal to energize said second indicating lamp and said second controlled valve is normally nonconducting current between the associated load terminals to deenergize said first indicating lamp when said resistance of said cesium cell is high when substantially no light is being produced by said neon lamp, the effective resistance of said cesium cell being reduced when light is produced from said neon lamp so that current is shunted away from said control terminal of said first controlled electronic valve to substantially prevent conduction between said first and second load terminals of said first controlled electronic valve to thereby deenergize said second indicating lamp and also to divert current into said control terminal of said second controlled electronic valve which, in turn, actuates current to flow between its said first and second load terminals thus energizing said first indicating lamp, said unidirectional electronic valves being connected to protect the associated first and second controlled electronic valves from large reverse voltage spikes.

12. A voltage indicator system as claimed in claim 11 wherein an additional controlled electronic valve is provided having a control terminal and first and second load terminals, said additional valve being interposed between said first controlled electronic valve and ground in such a manner that said second load terminal of said additional valve is connected to said second load terminal of said first controlled valve, and said first load terminal of said additional valve is connected directly to ground potential voltage, said control terminal of said additional valve being connected to said cathode terminal of said cesium cell, said control terminal of said additional valve being connected to respond to an open circuit of said cesium cell to prevent conduction between said first and second load terminals of said additional valve and also to prevent said second indicating lamp from being energized and to prevent said first indicating lamp from being deenergized regardless of the conducting state of said first controlled electronic valve.

13. A voltage indicator system as claimed in claim 12 wherein each of said controlled electronic valves comprises a solid state transistor wherein said first load terminal of each valve comprises a collector, said second load terminal of each valve comprises an emitter, said control terminal of each valve comprises a base, each of said unidirectional valves comprises a solid state diode, each of said biasing resistive components comprises resistors, and said set of resistive elements comprises a potentiometer.

14. A voltage indicator system as claimed in claim 13 wherein said first and second controlled valves comprise NPN transistors and said additional valve comprises a PNP transistor.

* * * * *